(12) United States Patent
Hu et al.

(10) Patent No.: US 8,396,220 B2
(45) Date of Patent: Mar. 12, 2013

(54) SYSTEM AND METHOD OF MOBILE CONTENT SHARING AND DELIVERY IN AN INTEGRATED NETWORK ENVIRONMENT

(75) Inventors: Chih-Lin Hu, Taipei (TW); Chien-An Cho, Taipei (TW); Po-Jung Wang, Taipei (TW)

(73) Assignee: National Central University, Taoyuan County (TW)

( * ) Notice: Subject to any disclaimer, the term of this patent is extended or adjusted under 35 U.S.C. 154(b) by 0 days.

(21) Appl. No.: 13/338,489

(22) Filed: Dec. 28, 2011

(65) Prior Publication Data

US 2012/0093317 A1  Apr. 19, 2012

Related U.S. Application Data

(62) Division of application No. 12/458,617, filed on Jul. 17, 2009.

(51) Int. Cl.
*H04W 12/08* (2009.01)
*H04W 12/04* (2009.01)

(52) U.S. Cl. ........ 380/270; 380/273; 713/165; 713/168; 713/176; 726/2; 726/3; 726/4; 726/21; 726/27; 709/203; 709/227; 709/229; 709/245; 705/51

(58) Field of Classification Search ............... 726/2–6, 726/26–30, 21; 709/203–206, 225–229, 709/245; 380/255, 277, 278, 270, 273; 713/165, 713/176, 168; 705/51
See application file for complete search history.

(56) References Cited

U.S. PATENT DOCUMENTS

| | | | | |
|---|---|---|---|---|
| 7,483,958 | B1 * | 1/2009 | Elabbady et al. | 709/217 |
| 7,869,602 | B1 * | 1/2011 | Faros et al. | 380/277 |
| 2006/0285694 | A1 * | 12/2006 | Kim et al. | 380/279 |
| 2007/0074019 | A1 * | 3/2007 | Seidel | 713/156 |
| 2007/0157295 | A1 * | 7/2007 | Mangalore et al. | 726/6 |
| 2007/0283420 | A1 * | 12/2007 | Rantalahti | 726/4 |
| 2008/0092211 | A1 * | 4/2008 | Klemets et al. | 713/176 |
| 2008/0301149 | A1 * | 12/2008 | Malcolm | 707/10 |
| 2009/0006853 | A1 * | 1/2009 | Li | 713/176 |
| 2009/0046633 | A1 * | 2/2009 | Thomson | 370/328 |
| 2009/0177792 | A1 * | 7/2009 | Guo et al. | 709/231 |
| 2009/0180617 | A1 * | 7/2009 | Peterka | 380/277 |
| 2009/0327560 | A1 * | 12/2009 | Yalovsky | 710/303 |
| 2010/0250704 | A1 * | 9/2010 | Kittel | 709/219 |
| 2010/0333131 | A1 * | 12/2010 | Parker et al. | 725/31 |

OTHER PUBLICATIONS

Chih-Lin Hu, Wei-Shun Liao, Yen-Ju Huang; Mobile Media Content Sharing in UPnP-Based Home Network Environment; Journal of information Science and Engineering 24, 1753-1769 , 2008.*
Chih-Lin Hu, Wei-Shun Liao, Yen-Ju Huang; Mobile Media Content Sharing in UPnP-Based Home Network Environment; Journal of Information Science and Engineering 24, 1753-1769 (2008).
Chih-Lin Hu, Chien-An Cho, Bo-Jung Wang; Secure Mobile Content Delivery Architecture in Hybrid Network Environment; 2008 International Symposium on Ubiquitous Multimedia Computing, Oct. 13-15, 2008, Hobart, Australia.

* cited by examiner

*Primary Examiner* — Philip Chea
*Assistant Examiner* — Shanto M Abedin
(74) *Attorney, Agent, or Firm* — Rosenberg, Klein & Lee

(57) ABSTRACT

A system and method of mobile content sharing and delivery in an integrated network environment, comprising; a first mobile terminal serving as information provider, a home server, and a second mobile terminal serving as information receiver. The information of said first mobile terminal is transmitted to said second mobile terminal through said home server, and that information can be stored in said home server for direct downloading of file by said second mobile terminal in an asynchronous transmission manner; when said first mobile terminal moves and switches to another network environment, said second mobile terminal still can request and download said information through said home server. A double key protection scheme is further provided in safeguarding secure transaction of information.

3 Claims, 4 Drawing Sheets

```
<ItemList> /* meta-data basic structure */
<Item Type="#{TypeName}" /* directory or file */
Name="#{FileName}"
Size="#{SizeInBytes}"
URL="#{DownloadURLReference}"/>
</ItemList>
```

Fig.3

SYSTEM AND METHOD OF MOBILE CONTENT SHARING AND DELIVERY IN AN INTEGRATED NETWORK ENVIRONMENT

RELATED APPLICATIONS

This application is a Divisional patent application of co-pending application Ser. No. 12/458,617, filed on Jul. 17, 2009, now pending. The entire disclosure of the prior application Ser. No. 12/458,617, from which an oath or declaration is supplied, is considered a part of the disclosure of the accompanying Divisional application and is hereby incorporated by reference.

BACKGROUND OF THE INVENTION

1. Field of the Invention

The present invention relates to a technology of data transmission in a network environment, and in particular to a system and method of mobile content sharing and delivery in an integrated network environment.

2. The Prior Arts

Nowadays, the progress and development of wireless communication technologies and mobile handheld devices (MHDs) have enabled users to get onto a specific network easily for accessing a plurality of information services through various mobile networks. From a different viewpoint, presently, quite a lot of MHDs are provided with simple digital camera functions, some of their high level versions are also capable of executing multi-media functions, such as audio recording/video recordings, etc. Therefore, an MHD can not only download various multi-media data from Internet, but the MHD itself is also capable of producing multi-media content; meanwhile, aided with the advance of data storage technology and an increase of its storage capacity, the library of multi-media content that can be stored on an MHD is getting increasingly enormous to an extent that it may serve as "a mobile information content provider device". When this situation happens, it is natural that a user of an MHD in a user group may have the desire to exchange and share media content with a user of another MHD in the user group.

Refer to FIG. 1 for a system block diagram of a mobile content sharing and delivery system in an integrated network environment according to an embodiment of the present invention. As shown in FIG. 1, in practice, for a mobile handheld device, there usually exist two or three wireless communication means. For instance, presently, quite a lot of mobile phones are provided with communication modules of wireless LAN, telecommunication network, and Bluetooth. A mobile handheld device (MHD) can access different networks simultaneously, therefore, it is capable of performing different network services on different network interfaces (for example, performing handset communication functions on GSM/UMTS interface, and performing webpage access/multi-media sharing services on WiFi etc.), in case that the services scattered and distributed on various different networks can be combined further into an integrated network software that can be executed in a multi-network environment, such that this sort of integrated network environment is capable of providing a brand new, ubiquitous information services having great potential for further development.

To be more specific, supposing that two users A and B each having his mobile handheld device (MHD) respectively and stay in a same wireless network at the same time. In this case, user A has some information content stored in his MHD and would like to share them with user B. To achieve this purpose, the MHD of user A will firstly look up and find automatically the MHD of user B, then the MHD of user A will proceed with the communications, preparations, and initiations of data transfer with the MHD of user B. In case that during data transfer, user B has to leave to another place, but at this time, the data transfer has not been finished yet. At this moment, user A may utilize his MHD for communicating with his home server (possibly through mobile, wired, or wireless network, etc.) requesting his home server to allow user B to download some specific files, then user A will provide user B with a set of specific certificates for executing the file downloading process that has not been finished yet. Subsequently, after leaving his original network, the MHD of user B can still download the rest of the data files from user A's home server through other available networks, even though at this time, user A and user B are in different network domains.

Compared with a fixed network system, wireless network and mobile network have some different characteristics and shortcomings as follows:

Low transaction throughput: due to intrinsic restrictions, large volume information content transfer between MHDs requires a fairly long period of time.

Limited Power Capacity: while almost all the MHDs are battery-powered, in order to prevent too much and too fast power consumption, long distance data transmission should be avoided.

Limited Transmission Range: for single-hop transmission range, the range in a PAN or WLAN is restricted to a few or dozens meters. Therefore, during data transmission, the range of distance between two moving MHDs is rather restricted, such that they must remain in a same network domain in proceeding with data transfer.

Lack of Mobility Support: usually, a mobile network system can only support terminal mobility for location management. However, it is a great challenge for the current mobile network systems to provide data transfer services with cross network mobility support.

For the reasons mentioned above, it is evident that the functions and performances of mobile content sharing and delivery of wireless network and mobile network of the prior art are not quite satisfactory, thus it has much room for improvements.

SUMMARY OF THE INVENTION

In view of the shortcomings and drawbacks of the prior art, the present invention discloses a system and method of mobile content sharing and delivery in an integrated network environment, so as to overcome the drawbacks and shortcomings of the prior art.

A major objective of the present invention is to provide a system and method of mobile content sharing and delivery in an integrated network environment. Wherein, a home server is utilized in providing asynchronous content delivery technology, such that media content transfer of the mobile handheld device in a hybrid and heterogeneous network is not restricted to the mobility of MHD and distance of data transfer, and that the connection of network devices and setting of file transfer mode do not have to be changed.

Another objective of the present invention is to provide a system of mobile content sharing and delivery in an integrated network environment. Wherein, three kinds of asynchronous content delivery services are provided: direct downloading, redirect downloading, and continued downloading conducted through a home server.

Another objective of the present invention is to provide a system of mobile content sharing and delivery in an integrated network environment. Wherein, a double key protection mechanism is utilized, such that home server can be convinced that a second mobile terminal serving as a receiver can be trusted. In this double key protection mechanism, a Provider Key is first generated in advance by a home server and a first mobile terminal serving as a provider, for safeguarding the mutual trust relations between the two parties; while the home server automatically generates a Transaction Key at the start of transmission transaction, in safeguarding the connection between a home server and the second mobile terminal is authentic.

To achieve the afore-mentioned objective, the present invention provides a system of mobile content sharing and delivery in an integrated network environment, comprising: a first mobile terminal, that is used to transmit information onto Internet; a home server, that is used to store or temporarily store the information of the first mobile terminal, and search for at least a receiver of the information in establishing a connection between the first mobile terminal and a receiver; and at least a second mobile terminal, that is used to serve as a receiver for receiving information transmitted from a home server.

In addition, the present invention provides a method of mobile content sharing and delivery in an integrated network environment, that is a kind of mechanism used for requesting and proceeding with continued transmission of data when the connection between a first mobile terminal, a home server, and at least a second mobile terminal is disconnected, including the following steps: providing by the home server a transmission deadline for the Transmission Transaction between a first mobile terminal and a second mobile terminal; generating a Provider Key in advance by the first mobile terminal and the home server; starting downloading of file by the second mobile terminal; and generating automatically a Transaction Key by the home server upon the start of Transmission Transaction, for safeguarding the connection between the home server and the second mobile terminal.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which:

FIG. 3 are program codes of a meta-data item for a file and directory in a virtual file system of a mobile content sharing and delivery system in an integrated network environment according to an embodiment of the present invention.

DETAILED DESCRIPTION OF THE PREFERRED EMBODIMENT

The purpose, construction, features, functions, and advantages of the present invention can be appreciated and understood more thoroughly through the following detailed description with reference to the attached drawings.

Figure 1:
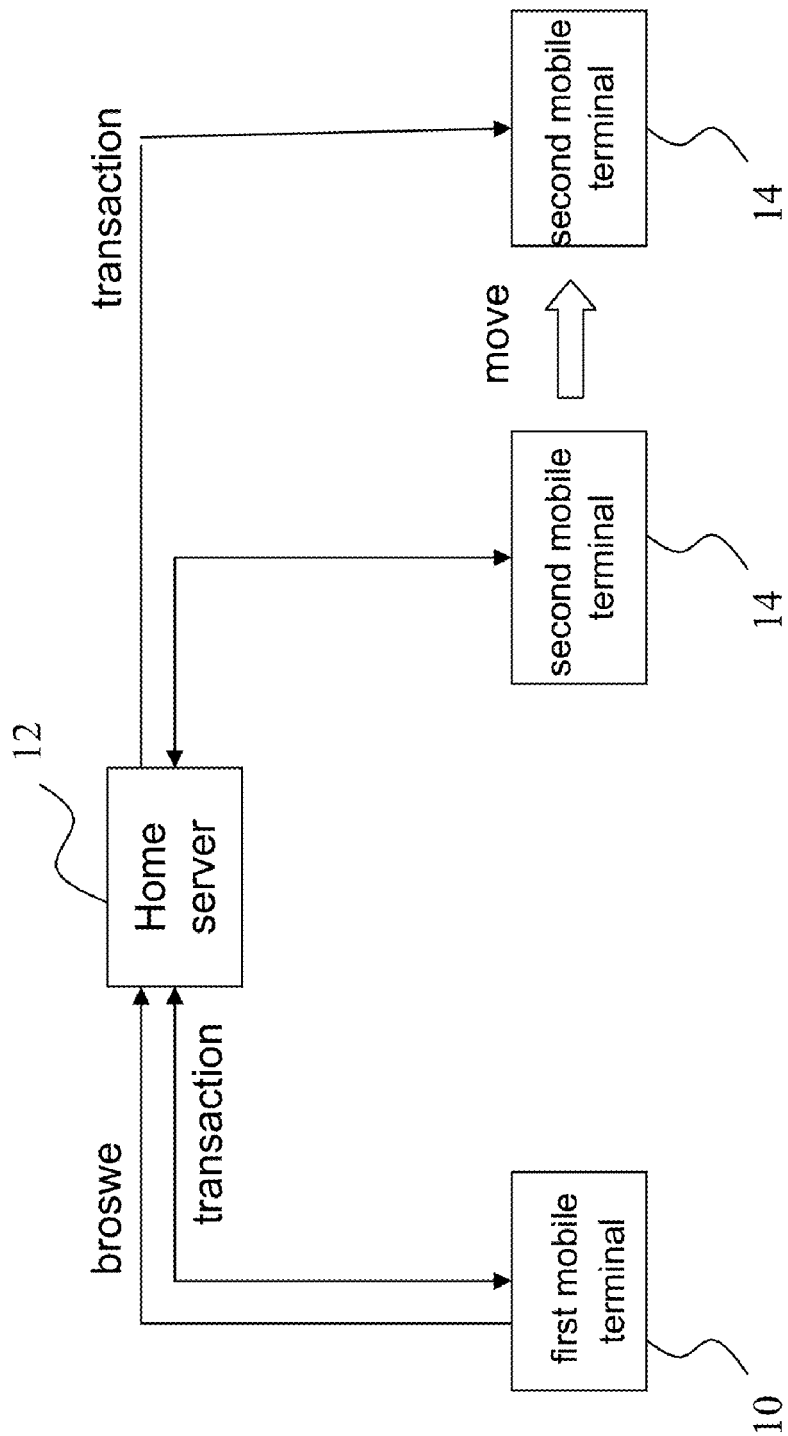
FIG. 1 is a system block diagram of a mobile content sharing and delivery system in an integrated network environment according to an embodiment of the present invention.

The present invention provides a system and method of mobile content sharing and delivery in an integrated network environment. Refer to FIG. 1 for a system block diagram of a mobile content sharing and delivery system in an integrated network environment according to an embodiment of the present invention. As shown in FIG. 1, the system of the present invention includes: a first mobile terminal 10, used to transmit information to a home server 12 on Internet; a home server 12, used to store or temporarily store the information of the first mobile terminal 10, and search for at least a second mobile terminal 14 serving as a receiver for establishing a connection between a first mobile terminal 10 and a second mobile terminal 14, so that the second mobile terminal 14 can receive the information of the first mobile terminal 10 through a home server 12.

In the implementation of the system of the present invention, the data transmission between the first mobile terminal 10 and the second mobile terminal 14 is realized through an Address Layer, a Discovery Layer, a Description Layer, and a Control Layer by means of a Universal Plug and Play (UPnP) protocol. Wherein, the Address Layer is used to obtain a network address for the first mobile terminal 10 and the second mobile terminal 14 respectively. When the first mobile terminal 10 and the second mobile terminal 14 join in a network, the Address Layer is used to request their respective addresses through a Dynamic Host Configuration Protocol (DHCP) or an automatic Internet Protocol (IP) mode, wherein, the automatic IP mode is utilized when Dynamic Host Configuration Protocol (DHCP) is not available for use; the first mobile terminal 10 utilizes the Discovery Layer in searching for the second mobile terminal 14 in a small-scale Local Area Network in a distributed manner by making use of a Simple Service Discovery Protocol (SSDP); the first mobile terminal 10 and the second mobile terminal 14 will periodically broadcast at predetermined positions, and indicate through the Description Layer the access positions of description text of the first mobile terminal 10 and the second mobile terminal 14 by means of a header in a broadcasted message; the Control Layer is a customized layer achieved through utilizing a Simple Object Access Protocol (SOAP), for integrating HTTP and XML technologies, in providing a set of web-service-based message transmission and remote control service, as such, data exchange and content sharing and browsing between the first mobile terminal 10 and the second mobile terminal 14 can be realized through the Control Layer.

Presently, the Universal Plug and Play (UPnP) Forum has already standardized the communication formats of some of the frequently used devices, so as to safeguard normal communications between similar types of devices of different manufacturers. However, the portions concerning mobile content delivery have not been defined yet. For this reason, in the present stage, the structure design of the present invention has customized a simple communication format by making use of a Control Layer, hereby fulfilling the basic requirements of exchange of meta-data and content sharing and browsing. In addition, though a message standard of the Simple Object Access Protocol (SOAP) can be utilized in a reliable network or a small scale Local Area Network in achieving fairly good efficacy, however, since the volume of the transmitted packaged messages is overly large, thus creating additional burden of computer calculations. For this reason, the Simple Object Access Protocol (SOAP) is not suitable to use in an unreliable wireless network environment, and long distance transmission. Therefore, in the present invention, the Control Layer of the Universal Plug and Play (UPnP) protocol is physically realized on a mobile communication device of a first mobile terminal and a second mobile terminal instead of on a home server. In addition, a set of remote transmission mechanisms similar to the framework of the Remote Procedure Call (RPC) protocol is proposed, that is suitable for used in mutual communication between a mobile device and a home server in a Wide Area Network.

With regard to the asynchronous data transmission, in the present invention, three basic data downloading services and content directory services are designed. Wherein, the content directory service is made in consideration of the fact that the original file system of the mobile handheld device is just too simple, therefore, the design of this service is based on a virtual file system of the first mobile terminal and the second mobile terminal, and the shared content are displayed according to the user requirement, such that all the shared items will generate corresponding meta-data, for example, the virtual file system may create classified directory of musical, image, film, etc. In addition, in order to prevent possible security threat, the file access address can be replaced by a string of garbled words, so that the virtual file system may correspond back to the original file system by referencing its identification code. The basic file description sample is as shown as the program codes in FIG. 3. The three asynchronous content delivery services are described as follows:

Direct Downloading Service: the second mobile terminal requests the first mobile terminal in providing a list of file directory it is willing to share, then, the second mobile terminal downloads the designated content directly from the first mobile terminal through a standard HTTP GET.

Figure 2:
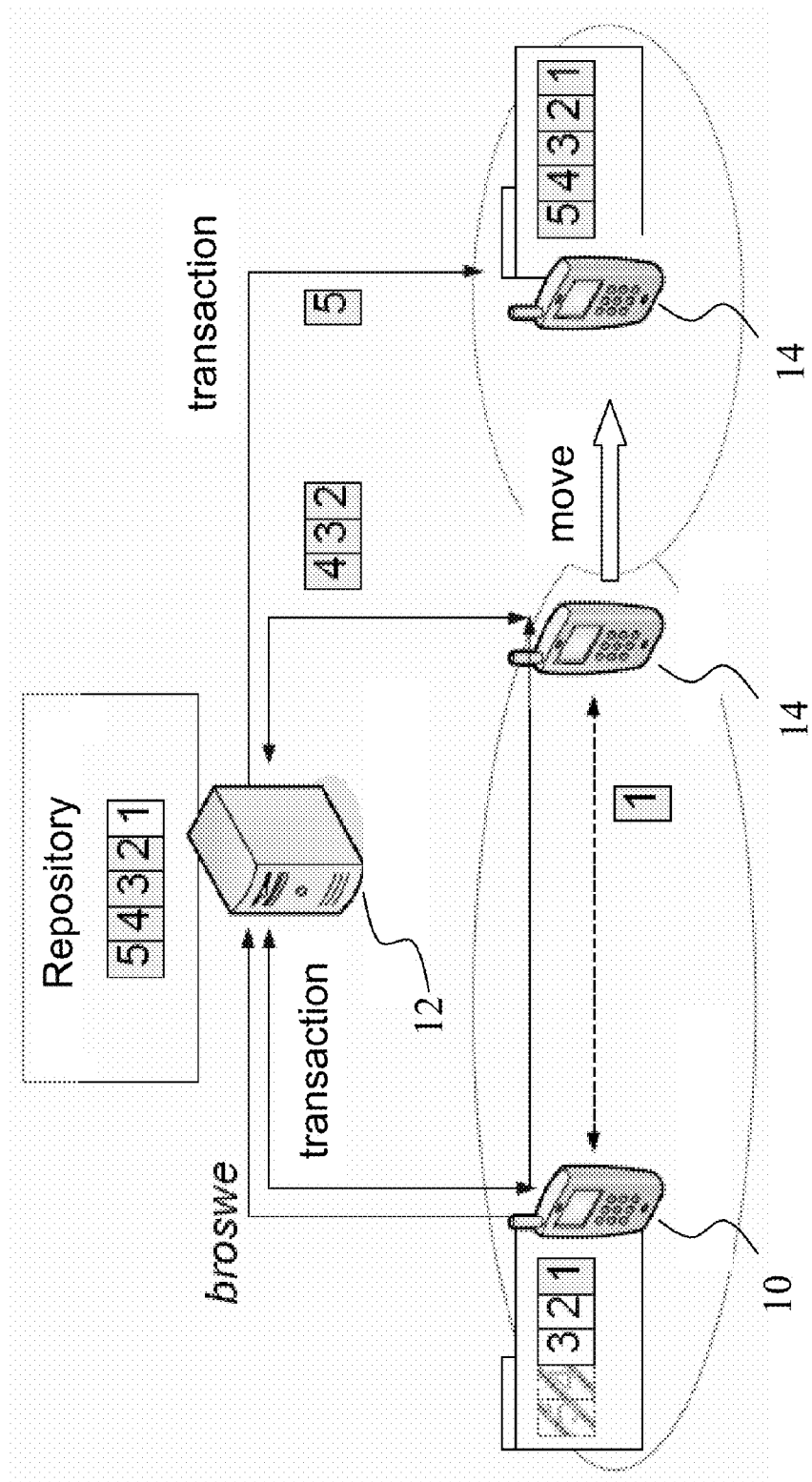
FIG. 2 is a schematic diagram of a Redirect Downloading Service provided by a mobile content sharing and delivery system in an integrated network environment according to an embodiment of the present invention.

Redirect Downloading Service: a first mobile terminal acting as a provider may direct a second mobile terminal acting as a receiver in switching to download information from a home server of the first mobile terminal. As such, this kind of download mode can be used to overcome the restriction of transmission distance and mobility, thus maintaining information delivery service. As shown in FIG. 2, three files 1, 2, and 3 are stored in the first mobile terminal 10, and 5 additional files 1, 2, 3, 4, and 5 are stored in a home server 12. The first mobile terminal 10 may request and obtain from home server 12 a copy of shared file list and determine a direct download list through comparing the shared file list with the list as requested by the second mobile terminal 14, then provide the second mobile terminal 14 with the direct download list, requesting it to switch to home server 12 for downloading the files required. In this case, refer to FIG. 2 as a reference for explanation. As shown in FIG. 2, only file 1 is delivered directly from the first mobile terminal 10, though files 2 and 3 exist also in the first mobile terminal 10, yet it may request the second mobile terminal 14 switching to a home server 12 of the first mobile terminal 10 in downloading files 2, 3, 4, and 5 through different networks.

Continued Downloading service: in a process of mobile content sharing, disconnection may happen, thus requiring reconnection for continued downloading of file. The design of this service may allow the second mobile terminal to continue data delivery service before the end of a transmission deadline. The second mobile terminal may continue the unfinished downloading work as long as the second mobile terminal still keeps the file location table of the home server.

Figure 4:
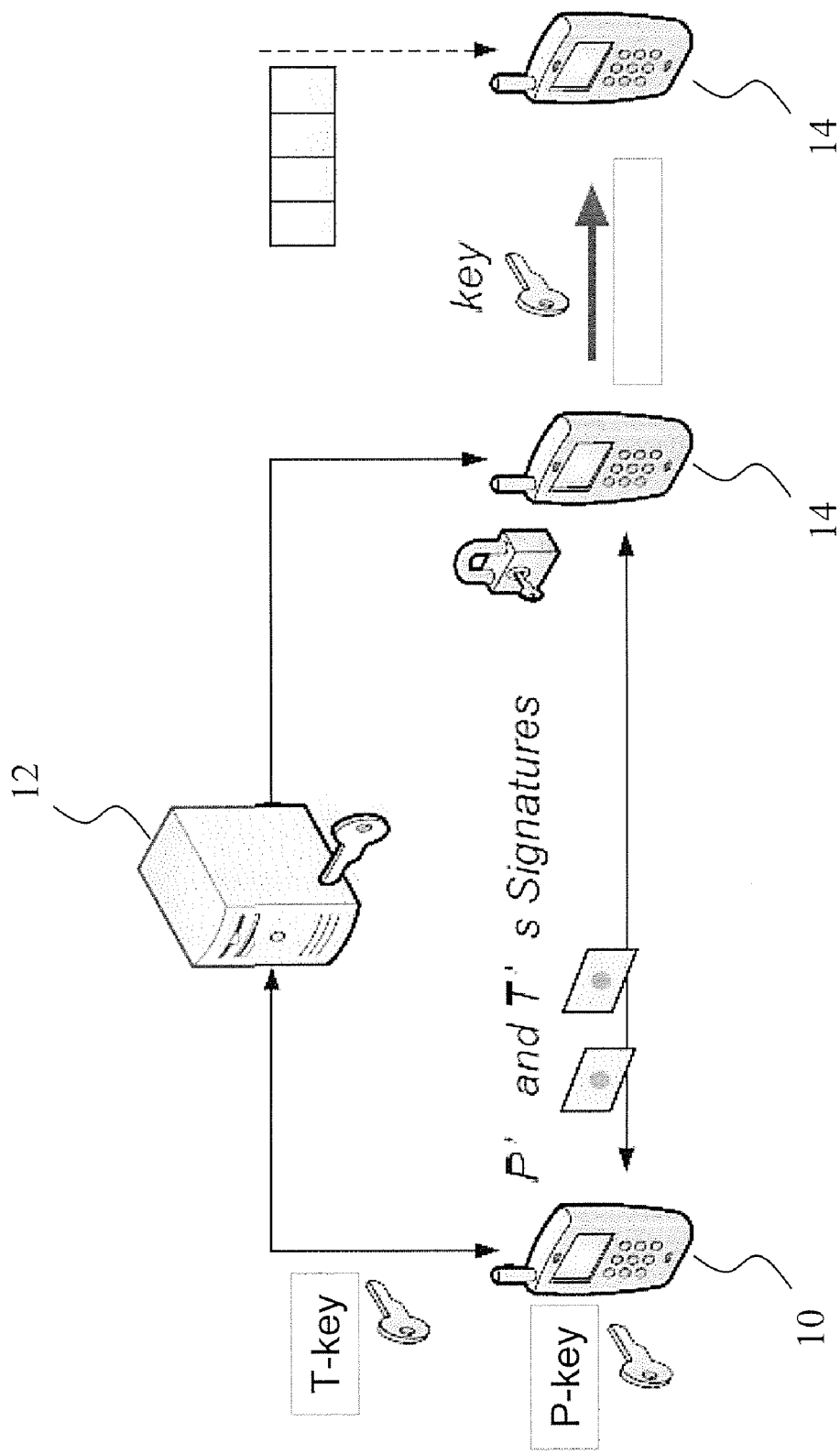
FIG. 4 is a schematic diagram of double key protection mechanism according to an embodiment of the present invention.

In a system framework of the present invention, a secure transaction means having authorization and verification mechanism is utilized. As shown in FIG. 4, when the first mobile terminal 10 requests initiating a redirect downloading service, it will initiate a secure transmission transaction, thus a home server 12 will be responsible for managing the process and status of the transaction. The process of this transaction will be assigned a transaction deadline, and this transaction deadline means the entire process of transmission transaction, comprising: starting from the moment that the first mobile terminal 10 informs the second mobile terminal 14 and home server 12 of its intention for downloading files, the second mobile terminal 14 may redirect and continue downloading files until it has finished downloading all the objects as required, unless any of the following conditions occurs: the second mobile terminal 14 terminates the delivery request, the transaction deadline expires or the intermission between two successive downloadings exceeds a predetermined interval, as such, ensuring the resources on home server 12 and the connected network resources can be utilized effectively.

In addition, in the transaction process, in order to ensure the home server 12 that the second mobile terminal 14 is trustworthy, in the present invention, a simple and symmetric double key protection mechanism is designed. Wherein, a pair of double keys, namely, provider key and transaction key are utilized as described as follows:

(1) Provider Key (P-Key): that is generated by a home server 12 and the first mobile terminal 10 in advance, and is used to ensure the trust relationship of the two parties. The Provider Key will be updated and refreshed periodically to avoid being cracked after several times of usage.

(2) Transaction Key (T-Key): that is a temporary key having transmission deadline of limited duration, and is generated automatically by the home server 12 at the start of transaction. The Transaction Key is effective only during the transaction, and is used to ensure the verification of identification during the transaction between the second mobile terminal 14 and home server 12. This will not be known to the second mobile terminal 14, and the Transaction Key will be invalidated immediately after the completion of a transaction, so as to avoid the possibility of leaking the transaction key to an unauthorized user for arbitrarily signing for downloading request. As such, in performing a redirect downloading, the first mobile terminal 10 will request and obtain a new transaction key from a home server 12, and this transaction key will not be known to the second mobile terminal 14. In addition, the transaction key will be invalidated immediately after the completion of transaction, so as to avoid being imitated or copied.

In the system framework of the present invention, data transfer between the first mobile terminal, the home server, and the second mobile terminal is conducted in a XML-RPC mode, and the data of the two fields Identifier and Signature are used to verify the identification and verification status of the home server and the receiver (namely, the second mobile terminal) in a process of Remote Procedure Call (RPC). Each of the RPC requests includes identification verification information of RPC transmitter (namely, the first mobile terminal), and that is used to verify if the transmitter is trustworthy or having sufficient authority to carry out the designated actions. Even more, the request has to include a set of verification codes for preventing data from being tarnished arbitrarily in executing actions not of the original design. Then, the a RPC home server may compare this set of verification codes with a verification code calculated by itself to determine if it is correct. The canonical forms of Identifier and Signature are as follows:

Identifier:=#{P-Key}|(#{P-Key}&#{T-Key})

Signature:=MD5(#{DigestURL_Raw})

Wherein, Identifier is a key portion, and that will not appear directly in the connection. Instead, it will first be stored in DigestURL_Raw for calculating and obtaining Signature value through utilizing MD5 algorithm or any other suitable algorithms, then it will be added into the connection and be used for verification. Since both Provider Key and Transaction Key are unique in a transaction process, such that RPC home server is able to determine if the message provider is trustworthy through verifying the Signature value.

In the present invention, a virtual file system is designed and provided in a home server, and is structured over an original file system, yet it does not have to reflect the directory structure of the original file system. The directory structure of virtual file system is formed by user-defined file and directory names, such that each file and directory may have a meta-data description item as shown in FIG. 3, plus some additional information of management purpose, wherein, the Uniform Resource Locator (URL) field is used to define specifically an actual type URL and a virtual type URL. The file of an actual URL is located at a corresponding position of an original file system, such as URL:=/URLBase/AV_Dir/Picture/My.jpeg; while a virtual URL is a temporary file position reference, and is generated dynamically by the service corresponding to its name, such as URL:=/URLBase/PicXXX.jpeg. Upon obtaining a virtual URL, the virtual file system will transform it into an Actual URL for presentation. The virtual URL is a set of dynamically generated meaningless word string. As such, for each transaction, it is required that a temporary access point be set up for the file shared and delivered, and this virtual mappings are stored, such that the second mobile terminal may request downloading files through this temporary access point until the completion of the transaction, then all the mappings and temporary access points generated in this process will be invalidated automatically. Therefore, this virtual file system and dynamic reference mapping mechanism provide a content directory service that is simple to use and secure. The dynamic reference mapping scheme can be utilized to enhance security without causing additional burden. When obtaining a virtual URL, the receiver may still performing file downloading via HTTP GET.

Summing up the above, in order to remove the mobility restriction in local area network, various existing network technologies and standards are integrated in providing a secure mobile content delivery mechanism and the support of asynchronous transmission. In the present invention, home server is defined to play an important role in power saving and mobility support. In general, mobile handheld devices (MHDs) are battery-powered. Therefore, the power consumption required for transmission of information from a mobile handheld device to another mobile handheld device is quite enormous, and this power consumption is symmetric, since both parties must spend power on data transmission. In the design of the present invention, an information provider can guide a receiver in switching to a home server having a stored copy for downloading files. The advantages of adopting this kind of asynchronous mobile content delivery are as follows: firstly, the home server on a fixed network may provide larger data throughput, hereby shortening data transmission time; secondly, the data provider can avoid long distance data transmission, thus reducing energy consumption; and thirdly, both data provider and data receiver are not restricted by the data transmission distance between them, so that they can move freely without having to be in a same network environment at the same time. In this case, the home server may take over the data transmission operation. As such, even if the original data provider has switched to other network or even leave all the networks, the process of file downloading and data transmission will not be affected. In addition, in the present invention, a double key verification mechanism is disclosed. Wherein, a Provider Key and a Transaction Key are provided, and that are utilized respectively in determining whether the home server and the data provider can trust each other; and in safeguarding the identification verification for the transaction between the data receiver and the home server. Moreover, in the present invention, a virtual file system is physically realized on a home server, such that a temporary access point is established by the virtual file system for a requested file in each transaction process, so that a data receiver can only request for downloading file through this temporary access point, thus, similarly, this temporary access point will be invalidated immediately upon the completion of the transaction. As such, through the application of a virtual file system and a dynamic access point mechanism, a home server can be protected from any illegal and unauthorized access.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A method of secure data transmission in an integrated network environment, that is a mechanism used for requesting continued data transmission, when a connection between a first mobile terminal, a home server, and at least a second mobile terminal is disconnected, comprising the following steps:
   providing a transmission deadline by said home server for a transmission transaction between said first mobile terminal and said second mobile terminal;
   generating a provider key in advance by said first mobile terminal and said home server;
   starting subsequent downloading of files by said second mobile terminal; and
   generating a transaction key by said home server automatically upon a start of said transmission transaction, so as to protect said connection between said home server and said second mobile terminal;
   wherein said first mobile terminal, said home server, and said second mobile terminal are used to proceed with data delivery in XML-RPC mode, and content of two data fields are used to verify an identification and an authorization status of said home server and said second mobile terminal; and
   said content of said data field are provided in said provider key and said transaction key.

2. The method of secure data transmission in an integrated network environment as claimed in claim 1, wherein
   said provider key is automatically updated periodically.

3. The method of secure data transmission in an integrated network environment as claimed in claim 1, wherein
   said second mobile terminal may resume downloading files in said transmission deadline until finishing downloading of said files.

* * * * *